(12) United States Patent
Kemist (10) Patent No.: US 8,751,320 B1
(45) Date of Patent: Jun. 10, 2014

(54) SYSTEM AND METHOD FOR DETERMINING INTERNAL FIT OF FOOTWEAR

(76) Inventor: Adam Kemist, Los Altos, CA (US)

( * ) Notice: Subject to any disclaimer, the term of this patent is extended or adjusted under 35 U.S.C. 154(b) by 240 days.

(21) Appl. No.: 13/348,571

(22) Filed: Jan. 11, 2012

Related U.S. Application Data

(60) Provisional application No. 61/432,170, filed on Jan. 12, 2011.

(51) Int. Cl.
*G06Q 30/00* (2012.01)

(52) U.S. Cl.
USPC .......................................................... 705/26.1

(58) Field of Classification Search
USPC ................................................ 705/26.1, 27.1
See application file for complete search history.

(56) References Cited

U.S. PATENT DOCUMENTS

| | | | |
|---|---|---|---|
| 1,725,334 A | 8/1929 | Brannock | |
| 4,876,758 A | 10/1989 | Rolloff et al. | |
| 5,339,252 A | 8/1994 | White et al. | |
| 5,640,779 A | 6/1997 | Rolloff et al. | |
| 5,689,446 A | 11/1997 | Sundman et al. | |
| 5,879,725 A | 3/1999 | Potter | |
| 6,160,264 A | 12/2000 | Rebiere | |
| 6,163,971 A | 12/2000 | Humphries et al. | |
| 6,192,593 B1 | 2/2001 | Borchers et al. | |
| 6,550,149 B2 | 4/2003 | Dowdell | |
| 6,741,728 B1 * | 5/2004 | Genest ........................... 382/115 | |
| 6,834,437 B1 | 12/2004 | Kilgore et al. | |
| 6,904,692 B2 | 6/2005 | Tadin | |
| 6,983,548 B1 | 1/2006 | Cook et al. | |
| 7,114,260 B2 | 10/2006 | Nguyen et al. | |
| 7,343,691 B2 | 3/2008 | Long et al. | |
| 7,346,998 B2 | 3/2008 | Tadin et al. | |
| 7,516,560 B2 | 4/2009 | Long | |
| 7,949,570 B2 | 5/2011 | Litke et al. | |
| 8,117,922 B2 | 2/2012 | Xia et al. | |
| 2004/0168329 A1 | 9/2004 | Ishimaru | |
| 2005/0049816 A1 | 3/2005 | Oda et al. | |
| 2008/0028625 A1 | 2/2008 | Nudelman et al. | |
| 2010/0293076 A1 | 11/2010 | End et al. | |
| 2013/0192071 A1 | 8/2013 | Esposito et al. | |

OTHER PUBLICATIONS

Anonymous, "Japanese Inventors Develop Shoe Selection Assistance Method," US Fed News Service, Including US State News, Aug. 18, 2006.*

* cited by examiner

*Primary Examiner* — Brandy A Zukanovich
(74) *Attorney, Agent, or Firm* — Lowenstein Sandler LLP (57) ABSTRACT

A computing device executing a footwear sizing module receives first fit parameters of a footwear having a first footwear size. The computing device computes additional fit parameters of additional footwear sizes of the footwear based on the first fit parameters. The computing device stores the first fit parameters and the additional fit parameters of the footwear in a data store.

20 Claims, 9 Drawing Sheets

United States Patent US 8,751,320 B1

SYSTEM AND METHOD FOR DETERMINING INTERNAL FIT OF FOOTWEAR

RELATED APPLICATIONS

This patent application claims the benefit under 35 U.S.C. §119(e) of U.S. Provisional Application No. 61/432,170, filed Jan. 12, 2011, which is herein incorporated by reference. This patent application is additionally related to co-pending U.S. patent application Ser. No. 13/348,472, filed Jan. 11, 2012 and to co-pending U.S. patent application Ser. No. 13/348,598, filed Jan. 11, 2012.

TECHNICAL FIELD

Embodiments of the present invention relate to the field of footwear sizing and selection and, more particularly, to a system and method for populating a data store with footwear data and using the footwear data to select footwear for users.

BACKGROUND OF THE INVENTION

The number one reason people buy a shoe is for the fit. Unfortunately, there is not a uniform standard for the fit of shoes. This means that a men's US 9.0 is not the same distance from heel to toe across manufactures. The shape of the shoe, commonly called the last, can also vary from manufacturer to manufacturer. Additionally, a single manufacturer may use more than one shape, which causes a difference in fit between shoes within the same manufacturer.

It is presently difficult for a consumer to determine how one shoe will fit compared to another without trying on the shoes. Accordingly, when shoes are sold on the internet or through a catalog, consumers frequently return shoes after trying them on at home due to a poor fit. This has created a high return rate for online retailers.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

A system and method for populating a footwear database or other data store with fit parameters for footwear and for searching the footwear database to identify footwear that will fit a user are described. As used herein, a fit parameter is a parameter associated with the internal fit of an article of footwear. Examples of fit parameters include internal footwear dimensions, heel-to-toe drop, pronation, arch support, and so forth. In some embodiments of the present invention, a computing device executing a footwear sizing module receives first fit parameters of a footwear having a first footwear size. The computing device computes fit parameters of additional footwear sizes of the footwear based on the first fit parameters. In one embodiment, computing the foot parameters of an additional footwear size is performed by computing a first internal girth of the first footwear size, determining an additional internal girth for the additional footwear size based on adjusting the first internal girth by a specified amount based on a difference between the first footwear size and the additional footwear size, and computing the fit parameters from the additional internal girth. The fit parameters for the first size and for the additional sizes are stored in a data store. In one embodiment, a footwear database is automatically populated with these fit parameters.

In some embodiments of the present invention, the system and method provide a user interface and workflow that enables users to identify footwear that will fit the users. In one embodiment, a computing device presents a user interface (e.g. a GUI) to a user that provides the user with an option to select a particular footwear (e.g., footwear model and size) and/or to input the user's foot measurements. The user interface may be presented via a web page or via a dedicated application running on a client machine. The computing device receives the particular footwear selection and/or the user's foot measurements. The computing device determines footwear fit parameters for the user based on at least one of the particular footwear or the user's foot measurements, and searches a data store for additional footwear having fit parameters that approximately match the determined fit parameters. Search results may be associated with match ratings that indicate a closeness of match to the determined fit parameters. The computing device determines an order for search results based on the match ratings, and displays the additional footwear in the determined order in the user interface, wherein the additional footwear are displayed with indications of the match ratings.

Embodiments of the present invention provide a quick and easy way to determine measurements for footwear and to search for footwear matching particular fit parameters. Footwear measurements produced in embodiments of the invention may enable users to accurately identify footwear that will fit them. A user interface described herein may enable a user to utilize the footwear measurements for footwear selection. Accordingly, embodiments of the present invention can significantly reduce the returns for online shoe purchases.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "computing", "displaying", "storing", "identifying," "determining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Figure 1:
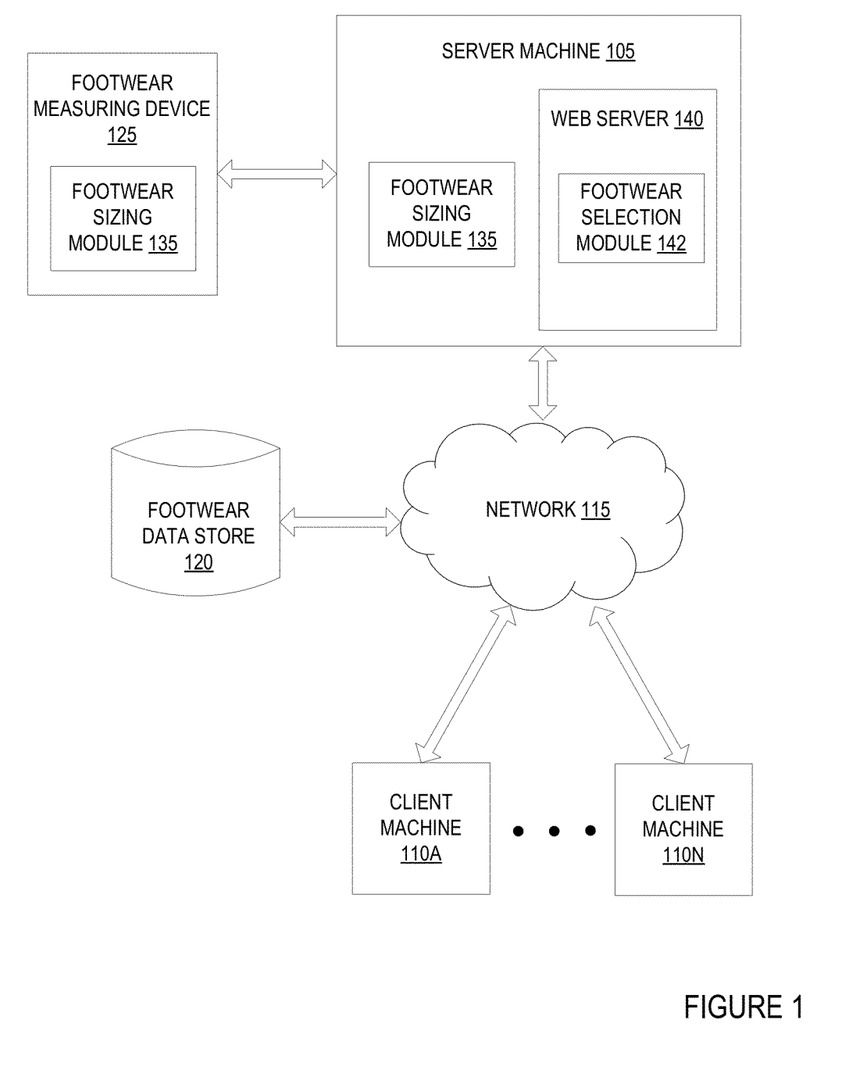
FIG. 1 illustrates an exemplary system architecture, in accordance with one embodiment of the present invention.

FIG. 1 illustrates an example system architecture 100, in accordance with one embodiment of the present invention. The system architecture 100 includes a server machine 105 connected to client machines 110A-110N via a network 115. Network 115 may be a public network (e.g., the Internet), a private network (e.g., a local area network (LAN) or wide area network (WAN)), or a combination thereof.

The client machines 110A-110N may be personal computers (PC), laptops, mobile phones, computer kiosks (e.g., at a brick and mortar footwear store), tablet computers, or any other computing devices. The client machines 110A-110N may run an operating system (OS) that manages hardware and software of the client machines 110A-110N. A browser (not shown) may run on the client machines (e.g., on the OS of the client machines). The browser may be a web browser that can access content served by a web server. The browser may issue web page requests, search queries and/or other commands to the web server. Additionally, an application designed to communicate with web server 140 may run on some of the client machines 110A-110N. For example, if client machine 110A is a tablet computer or mobile phone running Google's® Android® OS or Apple Computer's® iOS®, then client machine 110A may include an Android or iOS application (commonly referred to as an "App") configured to receive user input, communicate with web server 140, display footwear search results, and so forth.

Server machine 105 may be a rackmount server, a router computer, a personal computer, a portable digital assistant, a mobile phone, a laptop computer, a tablet computer, a camera, a video camera, a netbook, a desktop computer, a media center, or any combination of the above. Server machine 105 includes a web server 140 and a footwear sizing module 135.

In alternative embodiments, the web server 140 and footwear sizing module 135 may be run on different machines. In one embodiment, footwear sizing module 135 is run on a processor of a footwear measuring device 125. As used herein, footwear refers to any article of manufacture that is used as an outer covering for feet, such as shoes, boots and sandals.

In one embodiment, server machine 105 is connected to a footwear data store 120 via network 115. Alternatively, server machine 105 may be connected directly to footwear data store 120. Footwear data store 120 is a persistent storage that is capable of storing footwear data. The footwear data may include information on footwear model name and/or unique identifier, footwear size, footwear fit parameters, footwear type, footwear color, footwear heel height, footwear material, footwear pronation, footwear brand, footwear support, footwear price, footwear model, and so on. Each of these data items may be stored in separate fields of the data store. As will be appreciated by those skilled in the art, in some embodiments footwear data store 120 might be a network-attached file server, while in other embodiments footwear data store 120 might be some other type of persistent storage such as an object-oriented database, a relational database, and so forth, that may be hosted by the server machine 105 or one or more different machines coupled to the server machine 105 via the network 115.

In one embodiment, server machine 105 is connected to a footwear measuring device 125. Footwear measuring device 125 may quantify the internal dimensions of a shoe by measuring internal points as they relate to the foot. Using multiple sensors built into a standardized mold, particular internal fit points can be measured by the footwear measuring device 125. The information from the sensors may be used to determine internal dimensions inside a shoe or other footwear. The footwear measuring device 125 may be configured to be inserted into footwear of a particular size range to measure a series of fit parameters for the footwear (e.g., sizes US 9-US 10.5). In one embodiment, footwear measuring device 125 corresponds to a footwear measuring apparatus described in co-pending U.S. patent application Ser. No. 13/348,472, entitled "Apparatus For Measuring The Internal Fit of Footwear,", filed Jan. 11, 2012, which is herein incorporated by reference.

Footwear sizing module 135 may receive footwear fit parameters for one or more articles of footwear that has been generated by footwear measuring device 125. Received footwear parameters may be raw data such as voltage readings produced by potentiometers, or may be preprocessed data such as length measurements, volume measurements, circumference measurements, etc. If raw measurement data is received, then footwear sizing module 135 may convert the raw measurement data to human readable measurements such as length measurements, volume measurements, circumference measurements, etc. based on stored information about the footwear measuring device 125. The received footwear fit parameters may be for a specific size or sizes of footwear. Footwear measuring device 125 may connect to, and send footwear fit parameters to, server machine 105 via a wired connection (e.g., a universal serial bus (USB) connection, firewire connection, RS-232 connection, etc.) or a wireless connection (e.g., a Bluetooth connection, WiFi connection, Zigbee connection, etc.). Such sent footwear fit parameters may be unprocessed data, preprocessed data, fit parameters for a measured footwear size and/or computed fit parameters for unmeasured footwear sizes.

Footwear sizing module 135 may determine additional footwear fit parameters for the articles of footwear. For example, footwear sizing module 135 may receive two internal length measurements of the footwear and calculate there from a toe box shape and size. Similarly, the footwear sizing module may receive an internal width and height measurement corresponding to a particular region of the footwear, and compute there from an internal footwear volume or girth at that region. Additionally, footwear sizing module 135 may extrapolate the received and/or determined footwear fit parameters for a particular footwear size to additional footwear sizes. Thus, users are able to measure only a single size of footwear for a particular model, but still be able to accurately identify footwear fit parameters for most or all of the footwear sizes for that model of footwear. Footwear sizing module 135 is discussed in greater detail below with reference to FIG. 2.

Referring back to FIG. 1, web server 140 may be configured to server web pages and/or other information to client machines 110A-110N. Web server 140 may provide users of client machines 110A-110N with an ability to make queries, purchase goods, and so on. Web server 140 may include a footwear selection module 142. Alternatively, footwear selection module 142 may be a distinct component from the web server 140. Web server 140 may receive footwear search queries and/or footwear fit parameters from web browsers or other applications (e.g., dedicated applications running on client machines 110A-110N). Footwear selection module 142 may then perform searches on the footwear data in the footwear data store 120 to determine footwear that satisfy received search queries and/or match received or determined footwear fit parameters. Web server 140 may then send to a client machine 110A-110N footwear data for footwear that match a search query. This data may be sent and displayed to the client machines 110A-110N in the web browser or application running on the client machines (e.g., via web pages). Footwear selection module 142 is described in greater detail below with reference to FIG. 3.

Figure 2:
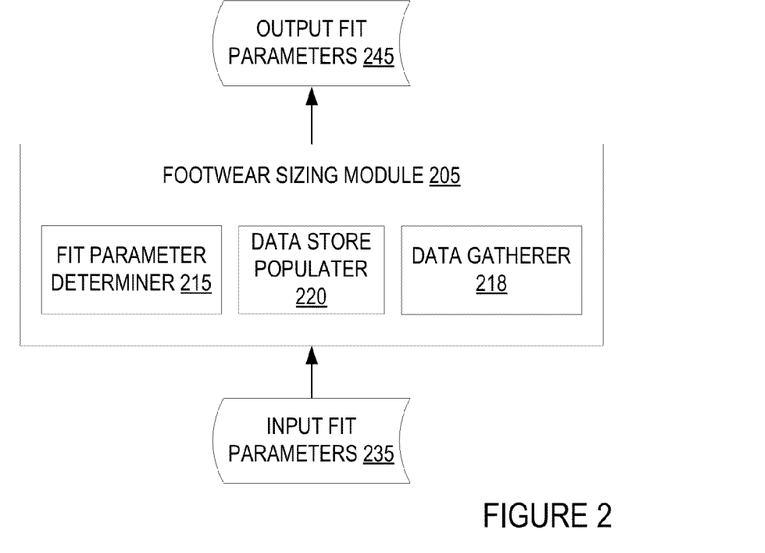
FIG. 2 is a block diagram of a footwear sizing module, in accordance with one embodiment of the present invention.

FIG. 2 is a block diagram of a footwear sizing module 205, in accordance with one embodiment of the present invention. In one embodiment, footwear sizing module 205 corresponds to footwear sizing module 135 of FIG. 1. In one embodiment, footwear sizing module 205 is integrated into a footwear measuring device. Alternatively, footwear sizing module 205 may be included in a desktop computer, server computer, notebook computer, tablet computer, or the like. The footwear sizing module 205 includes a fit parameter determiner 215 and a data store populator 220. Footwear sizing module 205 may also include a data gatherer 218. Note that in alternative embodiments, the functionality of one or more of the fit parameter determiner 215, data store populator 220 and data gatherer 218 may be combined into a single module or divided into multiple modules.

Footwear sizing module 205 receives a collection of input fit parameters 235 for a particular article of footwear having a particular size. In one embodiment, the input fit parameters 235 include an internal footwear length, an internal size and shape of the footwear at a toe box region, an internal width of the footwear at a ball-of-foot region, an internal height of the footwear at the ball-of-foot region, an internal volume of the footwear at the ball-of-foot region, an internal height of the footwear at a midfoot region, an internal width of the footwear at a heel region, an internal height of the footwear at the heel region, a collar height of the footwear, a heel-to-toe drop (difference between midsole height between heel and forefoot), pronation, arch support, and/or other fit parameters. In addition to receiving the input fit parameters 235, footwear sizing module 205 also receives one or more identifiers for the particular article of footwear. The identifiers may include a footwear brand, footwear model name, unique footwear identifier, footwear color, footwear type, footwear heel height, footwear material, footwear pronation, footwear support, footwear price, and so on. In one embodiment, the footwear (or footwear packaging) includes a bar code and/or a radio frequency identifier (RFID) that can be used to uniquely identify the particular footwear. A footwear measuring device or other device may scan the bar code and/or receive information from the RFID, and may report this information to footwear sizing module 205 along with the input fit parameters 235. Alternatively, a user may manually input one or more of the identifiers for the particular footwear.

In one embodiment, footwear sizing module 205 includes a data gatherer 218. If a footwear brand and model or footwear unique identifier are received, footwear data gatherer 218 may automatically determine additional information about the particular footwear for which input fit parameters have been received. In one embodiment, data gatherer 218 queries one or more internal or external data stores (e.g., databases of footwear manufacturers) for information on the particular footwear using the footwear brand and model or the unique identifier. Data gatherer 218 may associate received information with the input fit parameters 235.

Fit parameter determiner 215 computes additional fit parameters for one or more footwear sizes of a brand and model of footwear based on the input fit parameters 235. If the input fit parameters are received as unprocessed measurement data (e.g., voltage readings), fit parameter determiner 215 converts these readings into units of length, area and/or volume. Input fit parameters 235 may be for one or a few particular sizes of footwear. For example, input fit parameters may be for footwear having a size of US 9 (corresponding to Euro 42, UK 8, and 270 mm). Alternatively, or additionally, input fit parameters may be, for example, for footwear having a size of US 5 and for footwear having a size of US 15, or for footwear having sizes of US 8.5 and US 9.5. Fit parameter determiner 215 may determine additional fit parameters for footwear of the particular model and size (or sizes) for which input fit parameters were received. For example, received fit parameters may include only length measurements, and fit parameter determiner 215 may compute girth measurements, volume measurements, area measurements, and so forth from the received length measurements.

In one embodiment, fit parameter determiner 215 computes fit parameters for additional footwear sizes of a footwear model based on input fit parameters 235 of one or a few footwear sizes of that model. For example, fit parameter determiner 215 may receive input fit parameters 235 for a US 9 sized shoe and generate output fit parameters 235 for US 5 to US 15 size shoes based on the input fit parameters 235. For a particular model of shoe, different fit parameters vary by differing amounts as the size changes. For example, the length, toe box shape, width at ball of foot, width at midfoot, width at heel, height at ball of foot, height at midfoot, and so on may all change by different amounts with changes in shoe size. Accordingly, accurately computing fit parameters for unmeasured footwear sizes is nontrivial.

In one embodiment, fit parameter determiner 215 computes an internal length for an unmeasured footwear size by adding a predetermined value to a received internal length fit parameter for a measured footwear size. The predetermined value may be a constant times a number of shoe sizes between the measured shoe size and the shoe size being computed. Internal length may be computed according to the following algorithm:

$$l_2 = l_1 + (s_2 - s_1) \quad (1)$$

where $l_2$ is the internal length for the new size, $l_1$ is the internal length for the measured size, $s_2$ is the new size and $s_1$ is the measured size. The toe box size and shape can be computed according to a similar algorithm.

In one embodiment, fit parameter determiner 215 computes an internal width and internal height at a ball-of-foot region of footwear by computing an internal girth of the measured footwear, adjusting the internal girth by a specified amount, and then computing height and width fit parameters for a new footwear size based on the adjusted girth. The internal height fit parameter and internal width fit parameter may be included in input fit parameters 235. Fit parameter determiner 215 may approximate the internal girth of the measured footwear size by computing an ellipse based on the received internal width and internal height, as follows:

$$a_1 = \frac{w_1}{2} \quad (2)$$

$$b_1 = \frac{h_1}{2} \quad (3)$$

$$g_1 = \pi(a_1 + b_1) \left( \frac{1 + 3\left(\frac{a_1 - b_1}{a_1 + b_1}\right)^2}{10 + \sqrt{4 - 3\left(\frac{a_1 - b_1}{a_1 + b_1}\right)^2}} \right) \quad (4)$$

where $a_1$ is the semi-major axis for an ellipse, $b_1$ is the semi-minor axis for the ellipse, $w_1$ is the internal width of the measured footwear size, $h_1$ is the internal height of the measured footwear size, and $g_1$ is the internal girth for the measured footwear size.

Once fit parameter determiner 215 has computed the girth for the measured footwear size, fit parameter determiner 215 may adjust the girth by a specified amount based on a size difference between the measured footwear size and the new footwear size according to the following algorithm:

$$g_2 = g_1 + 6.35(s_2 - s_1) \quad (5)$$

Note that the above example algorithm is optimized for a US footwear sizing convention. The algorithm (e.g., constants) may change slightly for other footwear sizing conventions. Note that the difference between $s_1$ and $s_2$ may be represented as a number of half sizes. In such an instance, the constant multiplied by the difference may be 3.175.

Fit parameter determiner 215 may additionally compute a ratio between the computed girth (ellipse) for the measured footwear size and the semi-major axis for the ellipse as well as a ratio between the computed girth (ellipse) for the measured footwear size and the semi-minor axis for the ellipse, as follows:

$$x = \frac{a_1}{g_1} \quad (6)$$

$$y = \frac{b_1}{g_1} \quad (7)$$

where x is the ratio between the semi major axis and the girth and y is the ratio between the semi-minor axis and the girth.

Fit parameter determiner 215 may then compute the semi-major axis for the adjusted girth (ellipse) and the semi-minor axis for the adjusted girth (ellipse) as follows:

$$a_2 = xg_2 \quad (8)$$

$$b_2 = yg_2 \quad (9)$$

where $a_2$ is the semi-major axis for an ellipse that approximates the new girth and $b_2$ is the semi-minor axis for the ellipse. The semi-major axis and semi-minor axis may then be used to compute the internal width and internal height for the new shoe size, as follows:

$$w_2 = 2a_2 \quad (10)$$

$$h_2 = 2b_2 \quad (11)$$

where $w_2$ is the internal width of the new footwear size at the ball-of-foot region and $h_2$ is the internal height of the new footwear size at the ball-of-foot region.

Similar internal height and internal width parameters may be calculated for other footwear regions, such as at a midfoot region and/or a heel region, using the above described technique. In one embodiment, a single internal height measurement is taken, and this single internal height measurement is used to determine footwear girth at multiple different regions. For example, an internal height parameter may be associated with a ball-of-foot region, and may be used to compute footwear girth at the ball-of-foot region, midfoot region and/or heel region.

An internal heel width parameter may adjust minimally with changes in size. Accordingly, a measured heel width may be used for multiple footwear sizes. Alternatively, a heel width for a new footwear size may be computed according to the following algorithm:

$$z_2 = z_1 + \lambda(s_2 - s_1) \quad (1)$$

where $\lambda$ may be a fractional value such as 0.1, $z_2$ is the internal heel width for the new footwear size and $z_1$ is the internal heel width for the measured footwear size.

Data store populater 220 may automatically populate a data store with entries for footwear models and sizes. In one embodiment, data store populater 220 stores the input fit parameters 235 and output fit parameters 245 in a tabular structure. For example, data store populater 220 may store the fit parameters in a table (e.g., an excel spreadsheet) or as records in a database. There may be a separate field for each fit parameter, as well as for footwear model and footwear size. Additionally, there may be additional fields for information such as footwear color, footwear material, footwear support, and so on. A separate entry may be generated for each footwear size and model. Data store populater 220 may add information to appropriate fields of the table or database for footwear sizes and models. Notably, footwear sizing module 205 may receive partial or complete footwear fit parameters for a single footwear size of a footwear model, and may populate a data store with complete footwear fit parameters for an entire range of footwear sizes for that footwear model. This process may be performed quickly and with little or no user interaction, enabling an online retailer of footwear to generate a database of footwear with relative ease.

Figure 3:
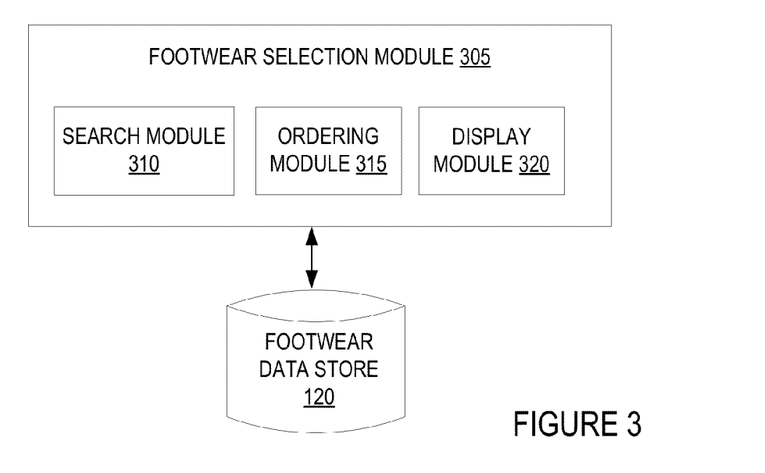
FIG. 3 is a block diagram of a footwear selection module, in accordance with one embodiment of the present invention.

FIG. 3 is a block diagram of a footwear selection module 305, in accordance with one embodiment of the present invention. In one embodiment, footwear selection module 305 corresponds to footwear selection module 142 of FIG. 1. The footwear selection module 305 includes a search module 310, an ordering module 315 and a display module 320. Note that in alternative embodiments, the functionality of one or more of search module 310, ordering module 315 and display module 320 may be combined into a single module or divided into multiple modules.

In one embodiment, footwear selection module 305 is a component of a web server and/or communicates with a web server. The web server may provide web pages (or other data) to end users via web browsers and/or other applications executing on client machines. The web pages may include interactive features that are displayed in the web browsers. These interactive features may include text boxes in which users can enter search terms, foot measurements and/or other information. The interactive features may further include dropdown menus that enable the user to select footwear types, footwear models, footwear sizes, and so forth.

Display module 320 may prompt a user to provide a footwear model and size of the user's foot measurements. Display module 320 may provide a video and/or image illustrating how the user is to measure his foot and the requested foot measurements. The requested foot measurements may include a foot length at the big toe, a foot length at the pinky toe, a foot width at the ball of the foot, a foot width at the midfoot (e.g., at the instep), a foot height at the ball of the foot, a heel width and/or a height of the ankle bone. The prompts, video and/or images may be provided to a web browser of the user via a web page. Footwear selection module 305 may receive user input from a web browser of a user in response to the user interacting with the web page. The user input may include the user's foot measurements and/or a user selection of particular footwear. The user selection of the particular footwear may include a particular footwear model and a footwear size.

Search module 310 may determine internal fit parameters appropriate to the user based on the received foot measurements and/or footwear model and size. The determined internal fit parameters may include, for example, an internal footwear length, an internal size and shape of the footwear at a toe box region, an internal width of the footwear at a ball-of-foot region, an internal height of the footwear at the ball-of-foot region, an internal volume of the footwear at the ball-of-foot region, an internal height of the footwear at a midfoot region and/or an internal width of the footwear at a heel region. Other fit parameters may also be determined.

Search module 310 may search a footwear data store (e.g., a footwear database or table) using the determined internal fit parameters as search criteria. Search module 310 may search for footwear sizes and models having fit parameters that vary from the determined fit parameters by less than a threshold amount. Search results may therefore include entries of those footwear models and sizes having fit parameters that vary from the determined fit parameters by less than the threshold amount. In one embodiment, search module 310 assigns match ratings to the search results, where a particular search result entry is assigned a high match rating if it has fit parameters that differ from the determined fit parameters by a small amount and is assigned a low match rating if it has fit parameters that differ from the determined fit parameters by a large amount. Alternatively, a lower match score may be associated with a better fit. In one embodiment, match ratings are divided into a good fit rating, a better fit rating and a best fit rating.

Ordering module 315 orders the search results based on their associated match ratings. Therefore, entries for footwear of a size and model having a best fit may be ordered before footwear of a size and model having less close fits. Display module 320 may then display the ordered search results to the user via an updated web page or other display. In one embodiment, the footwear are displayed with indications of the match ratings.

A user may select one or more search filters to narrow search results. Such search filters may be filters on footwear color, footwear type (e.g., running shoes, dress shoes, boots, etc.), pronation, heel height, footwear material, and so forth. In one embodiment, footwear selection module 305 maintains a record of prior user activity with regards to footwear. The prior user activity may include user searches for footwear, user purchases of footwear, user inquiries, a user web browsing history, and so forth. One filter that may be applied is a user preferences filter. If this filter is applied, footwear selection module 305 determines a user's footwear preferences based on the user's history, and then filters according to the user's footwear preferences. For example, if the user only shops for women's dress shoes, then all shoes other than women's dress shoes may be filtered out. Additionally, a user may request that particular fit parameters be ignored for the searching. For example, if the user doesn't care about heel width, then the user may request that heel width not be considered for the search of shoes with matching fit parameters.

Note that the user may also select a specific footwear model after the internal fit dimensions for the user are determined. Footwear selection module 305 may then identify a size of that particular model that is a closest match to that user's fit parameters, and may additionally identify how close of a fit that selected footwear model and size is. The footwear selection module 305 may highlight the sizing differences between the selected shoe and the determined fit parameters. If the selected footwear does not match the dimensions of the user's foot, the user would have the option to unselect any of the fit parameters. This would mean, for example, the user could choose not to compare the width of the heel to the new shoe requested. By doing so, the remaining fit parameters would then be used to determine the proper size and width, if available, and display the results to the user. Once all information requested by the software interface program the user would have the option to purchase the displayed shoe in the size and width or start the search again.

Figure 4:
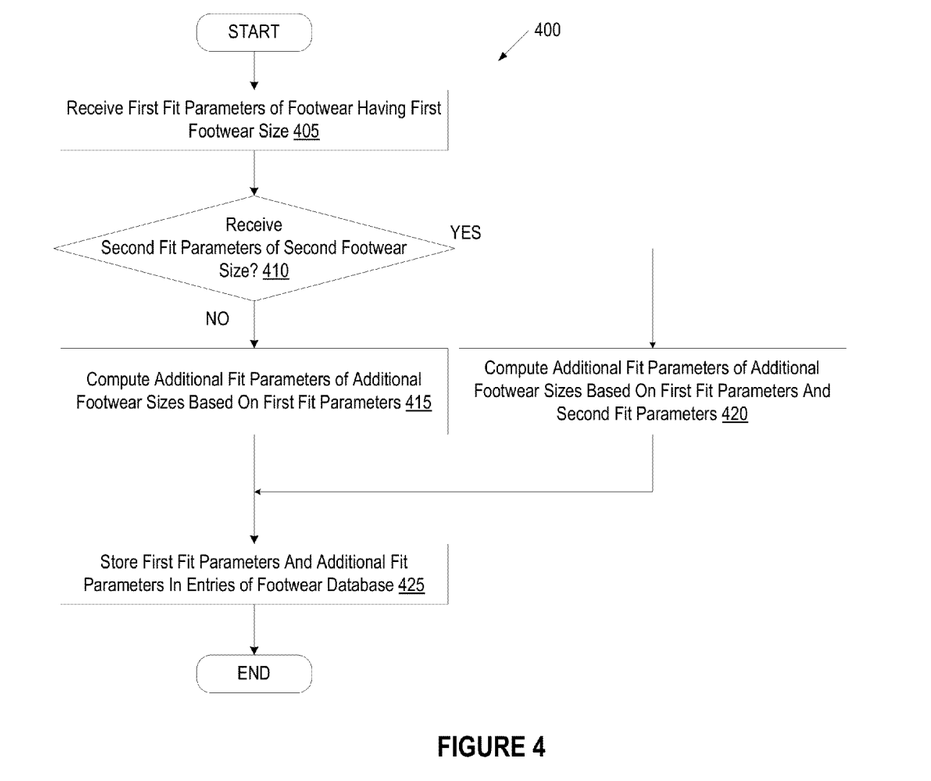
FIG. 4 is a flow diagram illustrating one embodiment for a method of populating a database with fit parameters for footwear.
Figure 5:
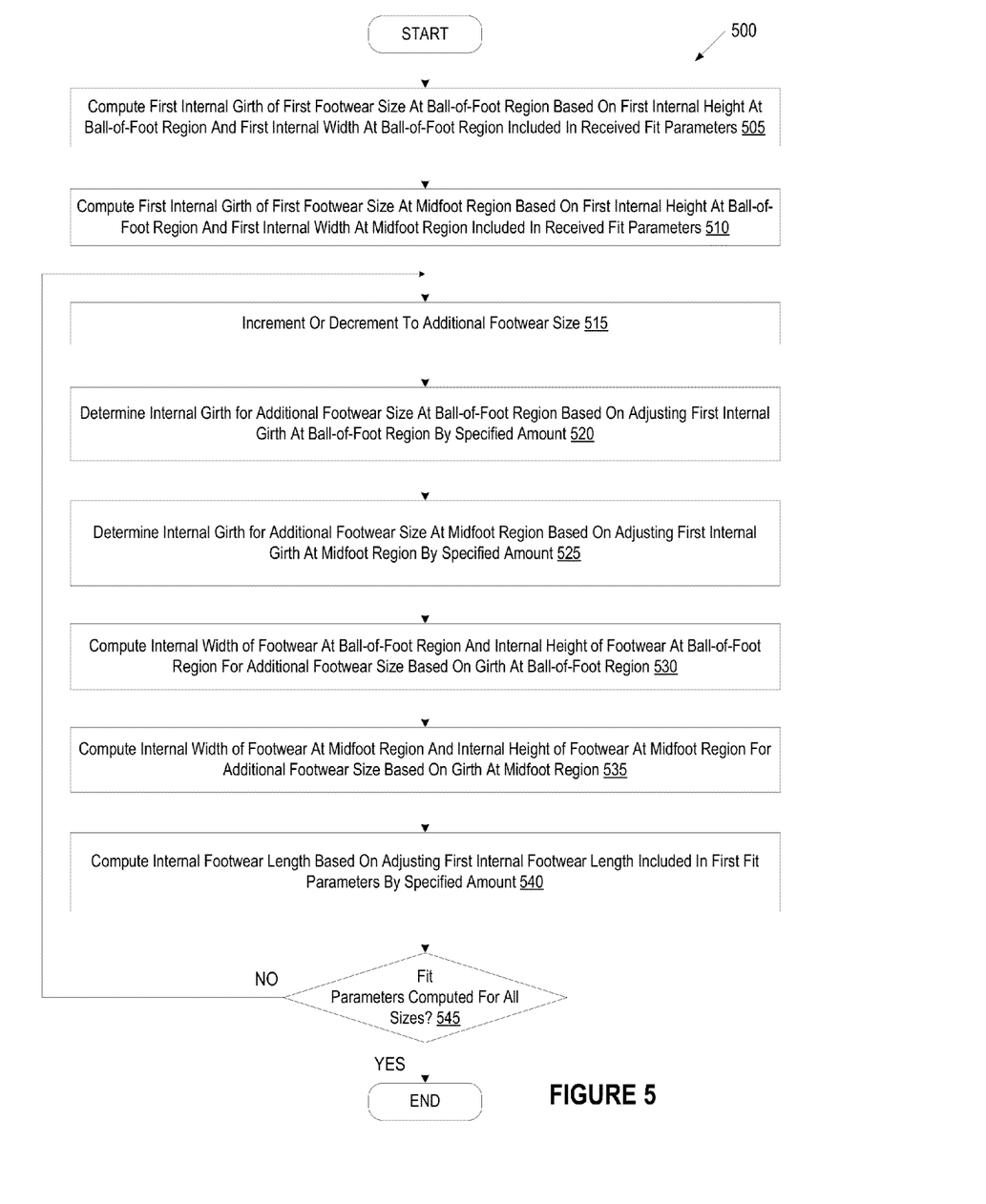
FIG. 5 is a flow diagram illustrating one embodiment for a method of extrapolating footwear fit parameters.
Figure 6:
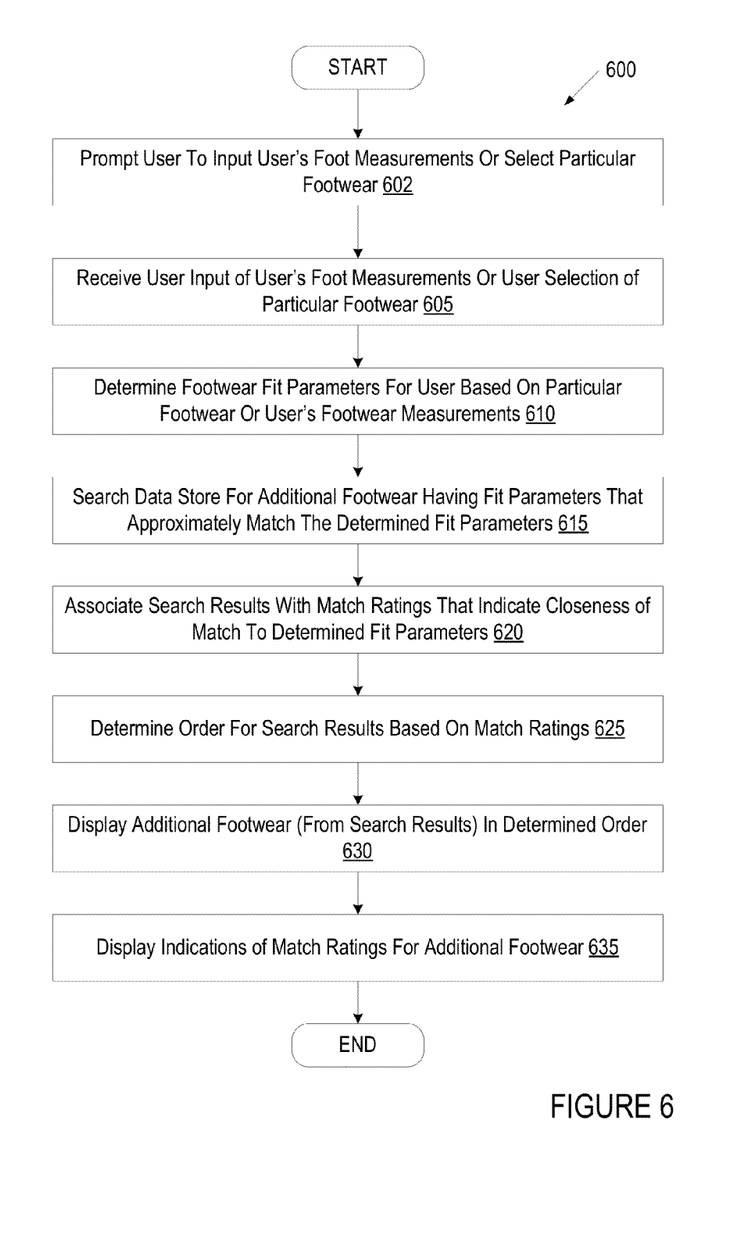
FIG. 6 is a flow diagram illustrating one embodiment for a method of identifying footwear that will fit a user.
Figure 7:
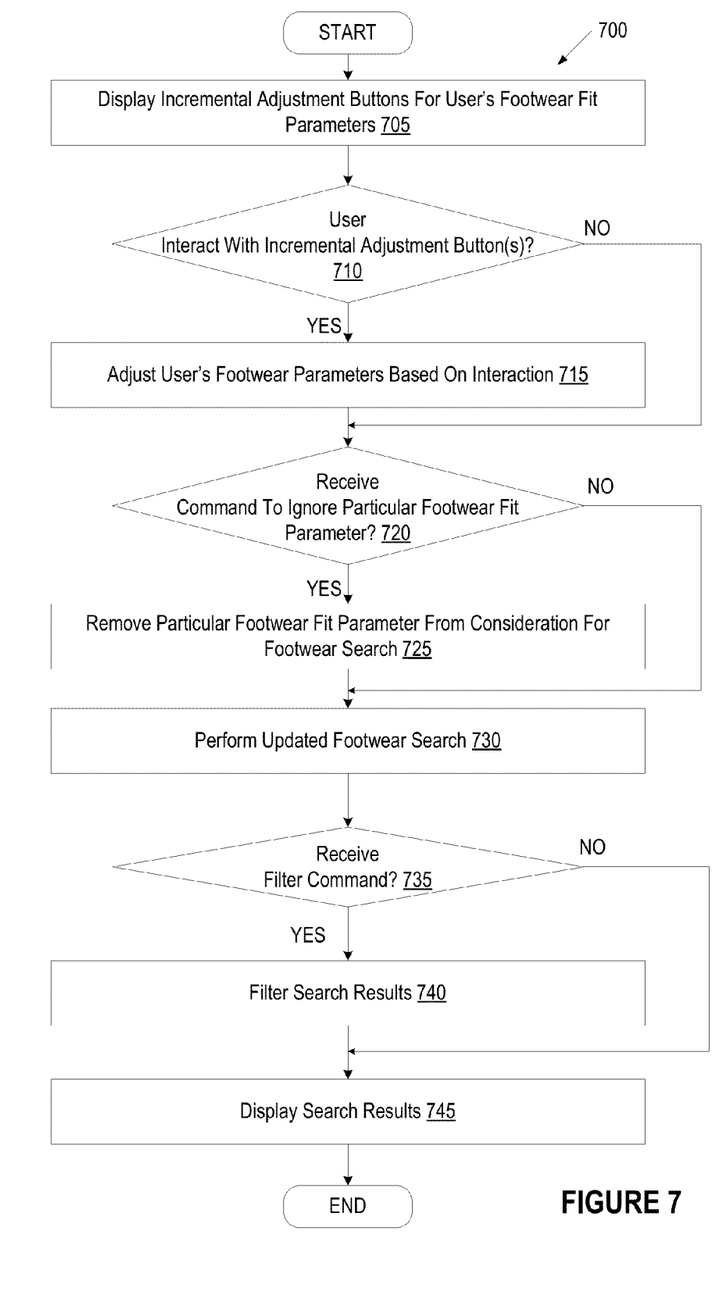
FIG. 7 is a flow diagram illustrating another embodiment for a method of identifying footwear that will fit a user.

FIGS. 4-5 are flow diagrams of various embodiments of methods for populating a footwear database (or other data store) with footwear data. FIGS. 6-7 are flow diagrams of various embodiments of methods for identifying footwear that will fit a user. The methods are performed by processing logic that may comprise hardware (circuitry, dedicated logic, etc.), software (such as is run on a general purpose computer system or a dedicated machine), or a combination of both. In one embodiment, the methods are performed by the server machine 105 of FIG. 1. The methods of FIG. 4-5 may be performed by a footwear sizing module 135 running on server machine 105 or another machine. The methods of FIGS. 6-7 may be performed by a footwear selection module 142 running on the server machine 105 or an additional machine. Note that the footwear sizing module 135 and footwear selection module 142 may run on separate machines.

FIG. 4 is a flow diagram illustrating one embodiment for a method 400 of populating a database with fit parameters for footwear. At block 405 of method 400, processing logic receives fit parameters of footwear of a particular footwear model having a first footwear size. The fit parameters may be unprocessed or processed fit parameters, and may include an internal footwear length, an internal size and shape of the footwear at a toe box region, an internal width of the footwear at a ball-of-foot region, an internal height of the footwear at the ball-of-foot region, an internal volume of the footwear at the ball-of-foot region, an internal height of the footwear at a midfoot region and/or an internal width of the footwear at a heel region.

At block 410, processing logic determines whether second fit parameters of a second footwear size have also been received. Additional footwear parameters of other footwear sizes may also be received. For example, footwear measurements for a maximum footwear size, for a minimum footwear size and for an intermediate footwear size may be received. If second fit parameters (and/or additional fit parameters) are received, the method continues to block 420. Otherwise, the method proceeds to block 415.

At block 415, processing logic computes additional fit parameters of additional (unmeasured) footwear sizes based on the first fit parameters. Processing logic may use different algorithms to adjust different footwear fit parameters based on a size difference between the measured footwear size and the footwear sizes for which fit parameters are being computed. In one embodiment, method 500 (described below with reference to FIG. 5) is performed at block 415 based on the first fit parameters.

At block 420, processing logic computes additional fit parameters of additional (unmeasured) footwear sizes based on the first fit parameters and second fit parameters (and also any additional fit parameters of other footwear sizes). In one embodiment, method 500 is performed at block 420 based on the first fit parameters, second fit parameters and/or additional fit parameters. Processing logic may compute fit parameters separately for each measured footwear size, and may then average these computed fit parameters. In one embodiment, processing logic computes a weighted average of the different computed fit parameters. The weight applied to a particular computed fit parameter may be based on a difference in size between the measured footwear size and the new footwear size for which the computed fit parameter has been generated. In an example, consider the case in which a size 15 footwear and size 5 footwear are measured. A size 14 fit parameter may then separately be computed based on the size 15 measurements and based on the size 5 measurements. These separately computed fit parameters may then be combined, with a higher weight being applied to the fit parameter computed from the size 15 measurements than from the fit parameter computed from the size 5 measurements. However, for a size 6 fit parameter, the computation from the size 5 measurements would be weighted more heavily.

At block 425, processing logic stores the received fit parameters and the computed fit parameters in a footwear database (or other data store). The method then ends.

FIG. 5 is a flow diagram illustrating one embodiment for a method 500 of computing fit parameters for footwear. At block 505 of method 500, processing logic computes a first internal girth of a first footwear size at a ball-of-foot region of the footwear based on a first internal height at the ball-of-foot region and a first internal width at the ball-of-foot region included in received fit parameters. At block 510, processing logic computes a first internal girth of the first footwear size at a midfoot region based on the first internal height at the ball-of-foot region and a first internal width at the midfoot region included in the received fit parameters.

At block 515, processing logic increments or decrements to an additional footwear size. For example, if the received fit parameters were for a US 9 size footwear, then processing logic may increment to a US 9.5 size footwear or decrement to a US 8.5 size footwear.

At block 520, processing logic determines an internal girth for the additional footwear size at the ball-of-foot region based on adjusting the first internal girth at the ball-of-foot region by a specified amount. The specified amount may be based on a difference between the first footwear size and the additional footwear size (e.g., if the first footwear size is 9 and the additional footwear size is 9.5, then the difference is one half size).

At block 525, processing logic determines an internal girth for the additional footwear size at a midfoot region based on adjusting the internal girth by a specified amount. The specified amount may be different from or the same as the specified amount used at block 520.

At block 530, processing logic computes an internal width of the footwear and an internal height of the footwear at the ball-of-foot region for the additional footwear size. At block 535, processing logic computes an internal width of the footwear and/or an internal height of the footwear at the midfoot region based on the computed girth at the midfoot region for the additional footwear size.

At block 540, processing logic computes an internal footwear length based on adjusting the first internal footwear length included in the received fit parameters by a specified amount. The specified amount may be based on a difference between the first footwear size and the additional footwear size.

At block 545, processing logic determines whether fit parameters have been computed for all sizes of footwear of the particular measured footwear model. If not, the method returns to block 515. If fit parameters have been computed for all footwear sizes, the method ends.

Note that method 500 may also compute fit parameters other than internal length, internal width at ball-of-foot region, internal height at ball-of-foot region and internal width at midfoot region. For example, method 500 may also be used to compute an internal width at a heel region, an ankle height at heel region, an internal toe box shape and size, and so on.

FIG. 6 is a flow diagram illustrating one embodiment for a method 600 of identifying footwear that will fit a user. At block 602 of method 600, processing logic prompts a user to input the user's foot measurements or to select a particular footwear having a footwear model and footwear size. The user may be prompted by a pop-up window or by a message in a web page, for example. At block 605, processing logic receives user input of the user's foot measurements and/or user selection of a particular footwear. The user input and/or selection may be received based on user interaction with a web page. For example, the user may type data into a text box, check or uncheck selection boxes, select from dropdown menus, and so forth.

At block 610, processing logic determines footwear fit parameters for the user based on the selected footwear or the user's foot measurements. At block 615, processing logic searches a data store for additional footwear having fit parameters that approximately match the determined fit parameters. In one embodiment, processing logic uses difference thresholds to determine whether an additional footwear entry approximately matches the determined fit parameters. If a fit parameter of an entry differs from a determined fit parameter by more than a threshold value, then a footwear entry may be determined not to be an approximate match. In one embodiment, different thresholds are applied for different fit parameters. For example, a threshold of 2 mm may be applied for an internal length and a threshold of 1 mm may be applied for an internal width at a ball-of-foot region. Thresholds may be represented as fixed values or as percentages of fit parameter measurements.

At block 620, processing logic associates search results with match ratings that indicate closeness of match to determined fit parameters. Higher match ratings may be associated, for example, with better matches. At block 625, processing logic determines an order for the search results based on the match ratings. At block 630, processing logic displays the additional footwear (from the search results) in the determined order. Processing logic may display images that show the footwear along with additional information such as footwear size. At block 635, processing logic displays indications of the match ratings for the additional footwear along with the displayed images. The additional footwear may be displayed via a web page that is served to a browser of a client computing device.

FIG. 7 is a flow diagram illustrating another embodiment for a method 700 of identifying footwear that will fit a user. In one embodiment, method 700 is performed after completion of method 600. At block 705 of method 700, processing logic displays incremental adjustment buttons for a user's footwear fit parameters. The footwear fit parameters may be based on a user selected footwear model and size or based on a user input foot measurements. The incremental adjustment buttons may be displayed as components of a web page. Each click or push of an incremental adjustment button may cause a 1 mm increment or decrement in one embodiment.

At block 710, processing logic determines whether a user has interacted with one or more of the incremental adjustment buttons. If the user interacts with an incremental adjustment button (e.g., clicks on or otherwise presses an incremental adjustment button) for a particular fit parameter, then that fit parameter is adjusted up or down by a predetermined incremental amount. Alternatively, the user may type in a new fit parameter value, bypassing the incremental adjustment button. If the user interacts with an incremental adjustment button, the method continues to block 715, and processing adjusts the footwear fit parameter (or parameters) based on the interaction. Otherwise, the method proceeds to block 720.

At block 720, processing logic determines whether a command to ignore a particular fit parameter has been received. A user may select or unselect particular fit parameters by clicking on selection boxes presented in a web page. By default, all fit parameters may be selected. If a command to ignore a fit parameter is received (e.g., by a user unchecking a fit parameter selection box), the method continues to block 725, and processing logic removes that particular fit parameter from consideration for a footwear search.

At block 730, processing logic performs an updated (or new) footwear search. The footwear search may be a query to a database for entries having fit parameters that differ from the considered fit parameters by less than threshold amounts. The fit parameters may be used as keys to search the database.

At block 735, processing logic determines whether a command to filter the search results has been received. The filter command may be a command to filter footwear search results based on footwear color, footwear style, footwear type, and so on. If so, then at block 740 processing logic filters the search results based on the specified filter. At block 745, processing logic displays the search results, which may be filtered or unfiltered. Note that the operations of block 735 may also be performed before the updated footwear search is performed.

Figure 8A:
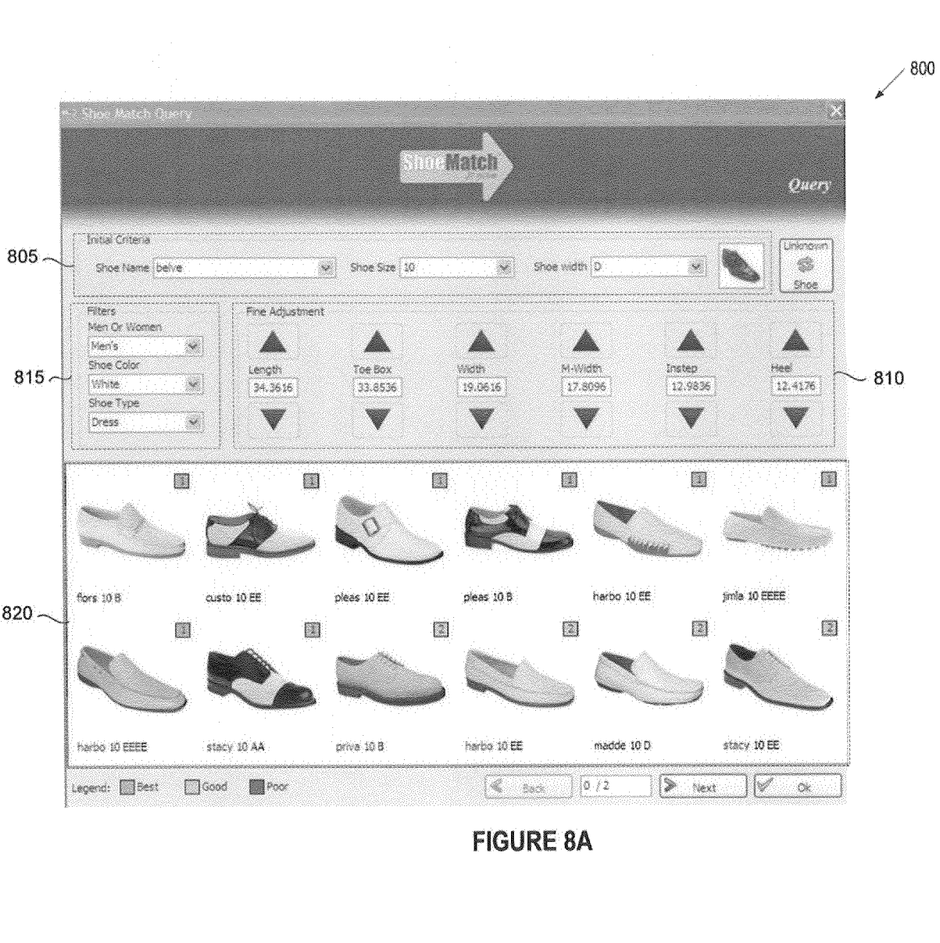
FIGS. 8A-8B illustrate various views of a user interface for identifying footwear that will fit a user, in accordance with embodiments of the present invention.

FIG. 8A illustrates a first view 800 of a user interface for identifying footwear that will fit a user, in accordance with one embodiment of the present invention. The user interface may be provided to a user via an interactive web page or via a dedicated application. As shown, the user interface includes initial criteria dropdown menus 805 by which a user can select a footwear model, size and width. Once the user selects a footwear model, size and width, fit parameters for those selections are shown along with incremental adjustment buttons 810. The user may click on an increment up button (shown as a triangle) or an increment down button (shown as an inverted triangle). As shown, there are fit parameters and incremental adjustment buttons for a length, toe box, width (at ball-of-foot), midfoot width (m-width), height (instep) and heel width (heel). A user may either click on incremental adjustment buttons or click on a text box containing a fit parameter value and input a new fit parameter value if he desires to modify presented values.

The user interface also includes one or more filters 815. The filters 815 may be drop down menus that provide one or more filter options. Shown are drop down menus for filtering based on gender, shoe color and shoe type. However, other filters may also be used.

Based on the user selected filters, reference footwear model, size and width and/or user specified fit parameters, a server will search for shoes that match displayed fit parameters. The interface may display models that match the entered dimensions in a descending order from best to worst. The user interface shows one or more search results 820 for footwear having fit parameters that meet one or more fit parameter match criteria (e.g., one or more difference thresholds). Search results may be displayed with an image of the footwear model, a name of the footwear model, a size and/or a width, for example. Additionally, search results may be displayed with an indication of closeness of match to the user's fit parameters. In one embodiment, closeness of match is color coded, such that green indicates a best fit, yellow indicates a good fit and red indicates a poor fit. Closeness of match may also be represented numerically. As shown, a numerical value of 1 represents a best fit, a numerical value of 2 represents a good fit, and a numerical value of 3 represents a poor fit. Alternatively, high values may indicate better fits. The user may select any of the displayed footwear for more information on that footwear and/or to purchase that footwear.

Figure 8B:
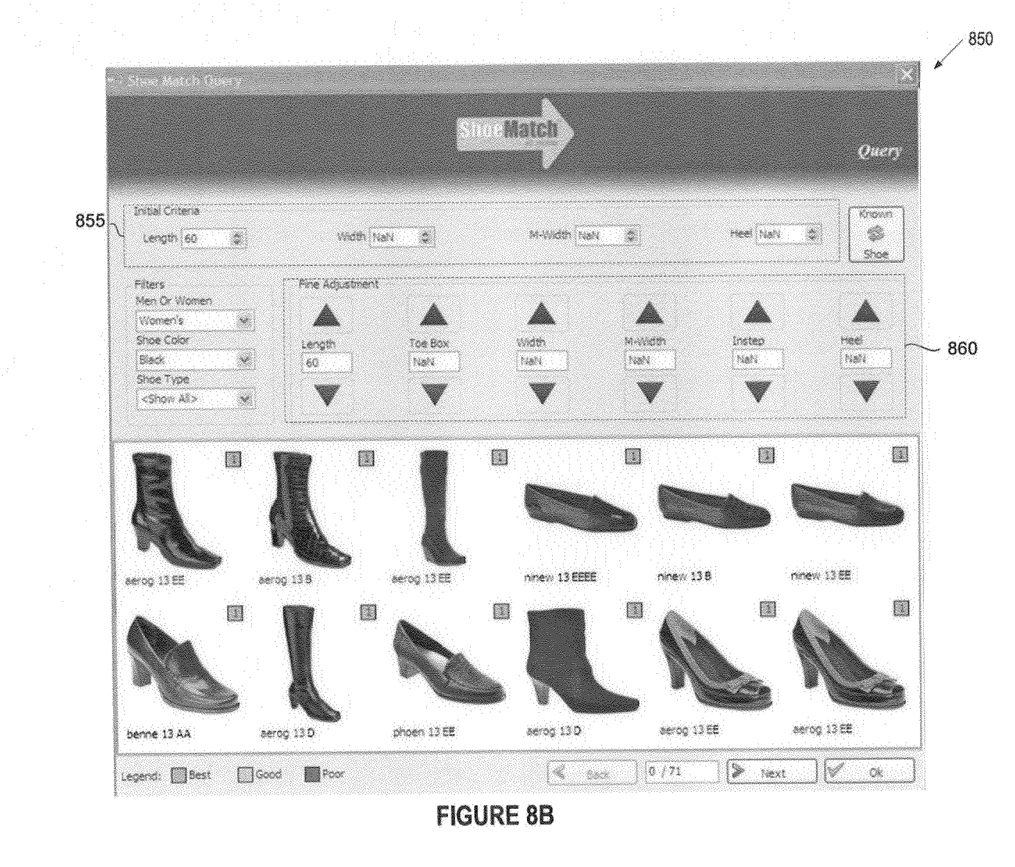

FIG. 8B illustrates a second view 850 of a user interface for identifying footwear that will fit a user, in accordance with one embodiment of the present invention. The second view 850 is substantially similar to first view 800 of FIG. 8A, except that in the second view drop down menus 855 are shown for enabling a user to input his or her foot measurements. Once the user has entered his or her foot measurements, fit parameters 860 are populated based on those input foot measurements. If the user wants to search for shoes using fewer than all of the fit parameters, then he or she may input foot measurements for fewer than all foot dimensions.

Figure 9:
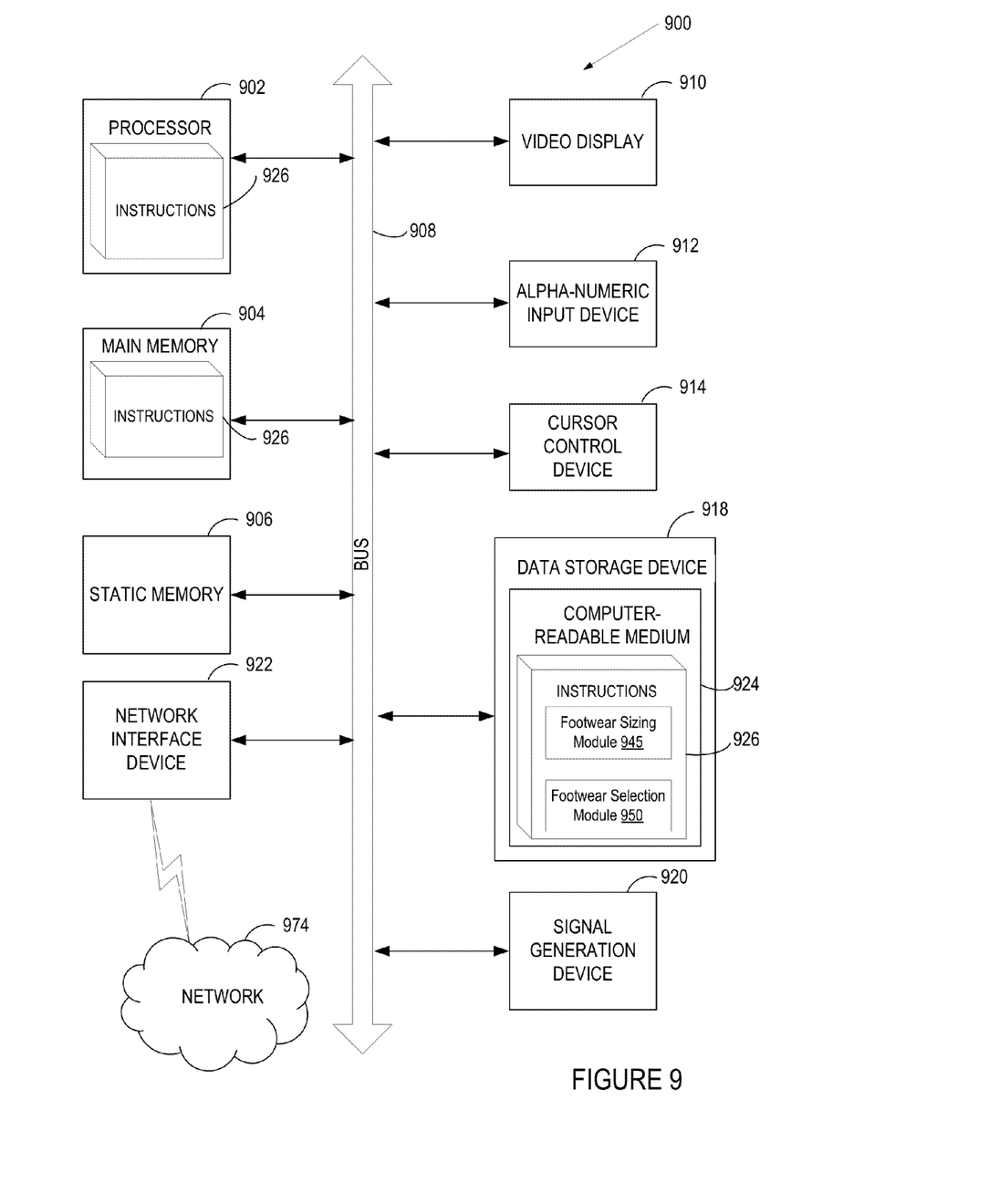
FIG. 9 is a block diagram of an exemplary computer system that may perform one or more of the operations described herein.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 926 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a computer-readable storage medium 924 on which is stored one or more sets of instructions 926 (e.g., software) embodying any one or more of the methodologies or functions described herein. The instructions 926 may also reside, completely or at least partially, within the main memory 904 and/or within the processor 902 during execution thereof by the computer system 900, the main memory 904 and the processor 902 also constituting computer-readable storage media. The instructions 926 may further be transmitted or received over a network 974 via the network interface device 922.

In one embodiment, the instructions 926 include instructions for a footwear sizing module 945 and/or a footwear selection module 950, which may correspond to object footwear sizing module 135 and/or footwear selection module 142 of FIG. 1, and/or a software library containing methods that call an object detection/recognition engine. While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
  receiving, by a computing device executing a footwear sizing module, first fit parameters of a footwear having a first footwear size;
  computing, by the computing device, additional fit parameters of additional footwear sizes of the footwear based on the first fit parameters, wherein computing the additional fit parameters for an additional footwear size comprises:
    computing a first internal girth of the first footwear size based on a first internal height of the footwear and a first internal width of the footwear included in the first fit parameters;
    determining an additional internal girth for the additional footwear size based on adjusting the first internal girth by a specified amount, wherein the specified amount is based on a difference between the first footwear size and the additional footwear size; and
    computing an additional internal height of the footwear and an additional internal width of the footwear for the additional footwear size based on the additional internal girth; and
  storing the first fit parameters and the additional fit parameters of the footwear in a data store.

2. The method of claim 1, wherein:
  the data store is a database, and an entry in the database comprises a footwear model, a footwear size and fit parameters for the footwear model and footwear size; and
  entries are automatically added to the database for the first footwear size and for the additional footwear sizes.

3. The method of claim 1, wherein the first fit parameters are received from a footwear measuring apparatus that is configured to measure the first fit parameters.

4. The method of claim 1, wherein the first fit parameters comprise at least one of an internal footwear length, an internal size and shape of the footwear at a toe box region, an internal width of the footwear at a ball-of-foot region, an internal height of the footwear at the ball-of-foot region, an internal volume of the footwear at the ball-of-foot region, an internal height of the footwear at a midfoot region and an internal width of the footwear at a heel region.

5. The method of claim 1, further comprising:
  receiving second fit parameters of a second footwear size of the footwear, wherein the additional fit parameters are computed based on the first fit parameters and the second fit parameters.

6. The method of claim 1, wherein computing the additional fit parameters for the additional footwear size further comprises:
  computing an additional internal footwear length based on adjusting a first internal footwear length included in the first fit parameters by a specified amount, wherein the specified amount is based on the difference between the first footwear size and the additional footwear size.

7. The method of claim 1, wherein the first internal girth is computed by approximating an ellipse based on the first internal height and the first internal width.

8. The method of claim 1, wherein:
  the first internal girth of the first footwear, the first internal height of the first footwear and the first internal width of the first footwear is at a ball-of-foot region; and
  the additional internal height of the footwear and the additional internal width of the footwear is at the ball-of-foot region.

9. A non-transitory computer readable storage medium having instructions for a footwear sizing module that, when executed by a processing device, cause the processing device to perform a method comprising:
  computing, by the processing device, additional fit parameters of additional footwear sizes of a footwear based on received first fit parameters of a first footwear size for the footwear, wherein computing the additional fit parameters for an additional footwear size comprises:
    computing a first internal girth of the first footwear size based on a first internal height of the footwear and a first internal width of the footwear included in the first fit parameters;
    determining an additional internal girth for the additional footwear size based on adjusting the first internal girth by a specified amount, wherein the specified amount is based on a difference between the first footwear size and the additional footwear size; and
    computing an additional internal height of the footwear and an additional internal width of the footwear for the additional footwear size based on the additional internal girth; and
    storing the first fit parameters and the additional fit parameters of the footwear in a data store.

10. The non-transitory computer readable storage medium of claim 9, wherein:
    the data store is a database, and an entry in the database comprises a footwear model, a footwear size and fit parameters for the footwear model and footwear size; and
    entries are automatically added to the database for the first footwear size and for the additional footwear sizes.

11. The non-transitory computer readable storage medium of claim 9, wherein the first fit parameters are received from a footwear measuring apparatus that is configured to measure the first fit parameters.

12. The non-transitory computer readable storage medium of claim 9, wherein the first fit parameters comprise at least one of an internal footwear length, an internal size and shape of the footwear at a toe box region, an internal width of the footwear at a ball-of-foot region, an internal height of the footwear at the ball-of-foot region, an internal volume of the footwear at the ball-of-foot region, an internal height of the footwear at a midfoot region and an internal width of the footwear at a heel region.

13. The non-transitory computer readable storage medium of claim 9, the method further comprising:
    receiving second fit parameters of a second footwear size of the footwear, wherein the additional fit parameters are computed based on the first fit parameters and the second fit parameters.

14. The non-transitory computer readable storage medium of claim 9, wherein computing the additional fit parameters for the additional footwear size further comprises:
    computing an additional internal footwear length based on adjusting a first internal footwear length included in the first fit parameters by a specified amount, wherein the specified amount is based on the difference between the first footwear size and the additional footwear size.

15. The non-transitory computer readable storage medium of claim 9, wherein the first internal girth is computed by approximating an ellipse based on the first internal height and the first internal width.

16. The non-transitory computer readable storage medium of claim 9, wherein:
    the first internal girth of the first footwear, the first internal height of the first footwear and the first internal width of the first footwear is at a ball-of-foot region; and
    the additional internal height of the footwear and the additional internal width of the footwear is at the ball-of-foot region.

17. A computing apparatus comprising:
    a memory to store instructions for a footwear measuring module; and
    a processing device, coupled to the memory, to execute the instructions, wherein the processing device is configured to:
        compute additional fit parameters of additional footwear sizes of a footwear based on received first fit parameters of a first footwear size for the footwear, wherein computing the additional fit parameters for an additional footwear size comprises:
            computing a first internal girth of the first footwear size based on a first internal height of the footwear and a first internal width of the footwear included in the first fit parameters;
            determining an additional internal girth for the additional footwear size based on adjusting the first internal girth by a specified amount, wherein the specified amount is based on a difference between the first footwear size and the additional footwear size; and
            computing an additional internal height of the footwear and an additional internal width of the footwear for the additional footwear size based on the additional internal girth; and
        store the first fit parameters and the additional fit parameters of the footwear in a data store, wherein entries in the data store comprise a footwear model, a footwear size and fit parameters for the footwear model and footwear size.

18. The computing apparatus of claim 17, wherein the processing device is further configured to receive second fit parameters of a second footwear size of the footwear, wherein the additional fit parameters are computed based on the first fit parameters and the second fit parameters.

19. The computing apparatus of claim 17, wherein the first internal girth is computed by approximating an ellipse based on the first internal height and the first internal width.

20. The computing apparatus of claim 17, wherein:
    the first internal girth of the first footwear, the first internal height of the first footwear and the first internal width of the first footwear is at a ball-of-foot region; and
    the additional internal height of the footwear and the additional internal width of the footwear is at the ball-of-foot region.

* * * * *